US010736463B2

(12) United States Patent
Gogel et al.

(10) Patent No.: US 10,736,463 B2
(45) Date of Patent: Aug. 11, 2020

(54) MULTIPORT/ROTARY VALVE SENSOR USING HALL EFFECT CONTROL

(71) Applicant: Henny Penny Corporation, Eaton, OH (US)

(72) Inventors: Mark Gogel, Richmond, IN (US); Edward J. Florkey, Vandalia, OH (US); Randy Caudill, Hamilton, OH (US); Steven Groll, Connersville, IN (US)

(73) Assignee: Henny Penny Corporation, Eaton, OH (US)

( * ) Notice: Subject to any disclaimer, the term of this patent is extended or adjusted under 35 U.S.C. 154(b) by 353 days.

(21) Appl. No.: 15/458,346

(22) Filed: Mar. 14, 2017

(65) Prior Publication Data

US 2017/0265683 A1    Sep. 21, 2017

Related U.S. Application Data

(60) Provisional application No. 62/309,650, filed on Mar. 17, 2016.

(51) Int. Cl.
 *A47J 37/12* (2006.01)
 *B08B 9/093* (2006.01)
(52) U.S. Cl.
 CPC ....... *A47J 37/1266* (2013.01); *A47J 37/1223* (2013.01); *A47J 37/1247* (2013.01);
 (Continued)
(58) Field of Classification Search
 CPC .... A47J 37/1223; A47J 37/1266; A47J 37/12; A23L 5/11
 See application file for complete search history.

(56) References Cited

U.S. PATENT DOCUMENTS 3,217,633 A   11/1965  Anetsberger
3,667,374 A    6/1972  Holmes
(Continued)

FOREIGN PATENT DOCUMENTS

KR   20150014634 A   2/2015

OTHER PUBLICATIONS

International Searching Authority, Search Report and Written Opinion issued in International Application No. PCT/US2017/022872 dated Jun. 12, 2017 (11 pages).
(Continued)

*Primary Examiner* — Dana Ross
*Assistant Examiner* — Lawrence H Samuels
(74) *Attorney, Agent, or Firm* — Wood Herron & Evans LLP

(57) ABSTRACT

Systems and methods for delivering a cooking medium in a cooking apparatus are disclosed. A delivery system includes a rotary valve having a rotary inlet and a plurality of rotary outlets. The rotary inlet is configured to be in fluid communication with a source of cooking medium and the plurality of rotary outlets are configured to be in fluid communication with a corresponding plurality of receptacles. A rotary position sensor generates a signal, having continuous angular position resolution, based on an angular position of the rotary valve. A controller receives the signal generated by the rotary position sensor and selectively places the rotary inlet in fluid communication with one of the plurality of rotary outlets based on the signal generated by the rotary position sensor. The rotary position sensor may include a Hall-effect sensor that functions at elevated operating temperatures associated with the cooking medium.

12 Claims, 8 Drawing Sheets

(52) U.S. Cl.
CPC ....... *A47J 37/1261* (2013.01); *A47J 37/1271* (2013.01); *A47J 37/1285* (2013.01); *B08B 9/093* (2013.01); *B08B 2209/08* (2013.01)

(56) References Cited

U.S. PATENT DOCUMENTS

| | | | |
|---|---|---|---|
| 3,735,693 A | | 5/1973 | Pelster et al. |
| 4,058,703 A | * | 11/1977 | Price .................. A47J 37/1266 |
| | | | 219/437 |
| 4,166,138 A | | 8/1979 | Ziminski et al. |
| 4,397,299 A | | 8/1983 | Taylor et al. |
| 4,502,373 A | | 3/1985 | Keating |
| 4,769,249 A | | 9/1988 | Webb |
| 4,848,318 A | | 7/1989 | Brewer |
| 5,244,370 A | | 9/1993 | DeMars |
| 5,301,847 A | | 4/1994 | Fehr et al. |
| 5,611,330 A | | 3/1997 | Corliss et al. |
| 5,617,777 A | * | 4/1997 | Davis .................. A47J 37/1223 |
| | | | 210/167.28 |
| 5,776,530 A | * | 7/1998 | Davis .................. A47J 37/1266 |
| | | | 426/233 |
| 5,988,051 A | | 11/1999 | Hashiguchi et al. |
| 6,009,794 A | | 1/2000 | Casey et al. |
| 6,068,872 A | | 5/2000 | Hashiguchi et al. |
| 6,131,564 A | | 10/2000 | Song |
| 6,182,561 B1 | * | 2/2001 | Garner .................. A47J 37/129 |
| | | | 99/403 |
| 6,202,543 B1 | | 3/2001 | Moya et al. |
| 6,254,790 B1 | | 7/2001 | King et al. |
| 6,405,738 B1 | | 6/2002 | Clark et al. |
| 6,777,009 B1 | * | 8/2004 | Shealy .................. A47J 37/1266 |
| | | | 426/231 |
| 8,497,691 B2 | * | 7/2013 | Behle .................. A47J 37/1223 |
| | | | 324/663 |
| 2005/0236402 A1 | | 10/2005 | Christiaansen et al. |
| 2006/0130670 A1 | | 6/2006 | Johnson et al. |
| 2007/0012367 A1 | | 1/2007 | Hotz et al. |
| 2007/0204858 A1 | * | 9/2007 | Abelbeck .................. F24C 3/12 |
| | | | 126/41 R |
| 2008/0121578 A1 | | 5/2008 | Burkett et al. |
| 2009/0309619 A1 | * | 12/2009 | Behle .................. A47J 37/1223 |
| | | | 324/698 |
| 2010/0116345 A1 | | 5/2010 | Florkey et al. |
| 2010/0212510 A1 | | 8/2010 | Hutson et al. |
| 2010/0300980 A1 | | 12/2010 | Burkett et al. |
| 2010/0326288 A1 | * | 12/2010 | Tiszai .................. A47J 37/1223 |
| | | | 99/355 |
| 2011/0129578 A1 | * | 6/2011 | Feinberg .............. A47J 37/1223 |
| | | | 426/233 |
| 2012/0256715 A1 | * | 10/2012 | Fullerton .................. H01F 7/021 |
| | | | 335/285 |
| 2013/0098847 A1 | * | 4/2013 | Lambert .............. A47J 37/1223 |
| | | | 210/744 |
| 2014/0004234 A1 | * | 1/2014 | Mosteller ............ A47J 37/1266 |
| | | | 426/231 |
| 2015/0135966 A1 | * | 5/2015 | Hulett .................. A47J 31/404 |
| | | | 99/289 R |
| 2015/0159882 A1 | * | 6/2015 | Heinz .................... A47J 36/32 |
| | | | 99/337 |

OTHER PUBLICATIONS

International Searching Authority, Search Report and Written Opinion issued in International Application No. PCT/US2017/022866 dated Jul. 24, 2017 (12 pages).

International Searching Authority, Search Report and Written Opinion issued in International Application No. PCT/US2017/022997 dated Aug. 17, 2017 (13 pages).

* cited by examiner

MULTIPORT/ROTARY VALVE SENSOR USING HALL EFFECT CONTROL

CROSS REFERENCE TO RELATED APPLICATIONS

This application claims the priority of Provisional Application Ser. No. 62/309,650, filed Mar. 17, 2016, the disclosure of which is incorporated by reference herein. This disclosure is also related to U.S. Pat. No. 9,528,510, the disclosure of which is incorporated by reference herein.

TECHNICAL FIELD

The invention generally relates to fryers used for cooking food products, and in particular, to systems and methods for managing recirculation of a cooking medium of a fryer system.

BACKGROUND

Oil-based frying is commonly used as a cooking method for a wide range of food products, such as poultry, fish, potato products, and the like. Commercial fryers include one or more fry pots that are filled with a cooking medium such as oil or solid fats. Heat is typically provided to the cooking medium using an electrical heating element submerged in the cooking medium or a gas burner thermally coupled to the cooking medium though the walls of the fry pot. When the cooking medium reaches a preset cooking temperature, food products are placed into the cooking medium for a predetermined amount of time during which the food products are cooked by heat from the cooking medium. To facilitate insertion and removal of the food products, the food products are typically placed inside a container, such as a wire basket, and the container is lowered into the cooking medium for the predetermined amount of time.

The cooking medium is normally re-used for multiple cooking cycles, which may include cooking cycles for different food products. However, the cooking medium degrades over time. This degradation may be due to contamination by particles shed by the food products being cooked and from chemical degradation due to heat, oxidation, and reactions with the food products. In addition, as food particles accumulate in the cooking medium, the flavor characteristics of the food particles may become infused in the cooking medium. This infusion may adversely affect the quality of cooked food. For at least these reasons, the cooking medium must occasionally be replaced.

To maintain cooking quality and to prolong the operational lifetime of the cooking medium, the cooking medium may be filtered periodically. The filtering process removes cooking by-products, such as suspended food particles ranging from dust-sized particles to larger pieces of crackling and small pieces of food product. Frequent filtering may extend the useful life of the cooking medium, thereby reducing the cost of operating the fryer by reducing the frequency with which the cooking medium must be replaced. The cost savings from filtering may be particularly beneficial when using a cooking medium that contains reduced amounts of transfats, which have become popular, but are typically more expensive than other types of cooking media. Thus, it may be economically beneficial to frequently filter the cooking medium to extend its useful life.

Some conventional pressure and open fryers include automated oil management systems which route oil through fryer subsystems to accomplish oil management tasks such as recirculation, filtering, and discarding used oil. To avoid mixing multiple types of cooking media in a vessel, some conventional fryer systems use a system of plumbing, such as pumps, check valves, and solenoid valves to regulate the return of the cooking medium to the fryer from which the cooking medium was filtered. In some conventional fryers, each cooking vessel may have its own corresponding pumps, check valves, and solenoid valves.

In some systems, as many as eight fry pots or divided cooking chambers are included in each fryer. These additional parts cause the fryer to take up a larger space than would otherwise be necessary. Further, the additional piping and cooking medium routing elements require more cooking medium than otherwise would be necessary for a fryer system using some shared components. In the interest of increasing throughput by providing a greater number of fry pots while maintaining efficient use of space, there is a need to reduce the amount of space required to house the components of the fryer. To this end, it is desirable to enable a plumbing system to operate with multiple different fry ports or cooking chambers.

A previous version of a solution to address some of these problems is shown at U.S. Pat. No. 9,528,510, which is owned by the original assignee of this disclosure. That patent provides a multiport rotary valve for directing flow between one or more cooking medium sources and one or more cooking chambers. The position control for the valve is performed mechanically with cams and switches in this version. The mechanical cams and switches are subject to wear out and/or be affected in operation when oil vapor or water is present, which may occur in the environment fryers are located. To this end, the generally harsh environmental conditions (temperature and oils/dusts in the air) around fryers can make it difficult to assure reliability of sensors and control systems for such valves. If the position sensing of the rotary valve becomes inaccurate, cooking medium being filtered through a filtration system could potentially be routed back to the wrong cooking chamber, and as such, it would be desirable to develop a system that avoids such possibilities.

SUMMARY

The disclosed embodiments overcome the above-described shortcomings of the related art and provide systems, methods, and computer program products that provide increased throughput and efficient use of space. A technical advantage of the disclosed systems is that multiple solenoid valves may be replaced by a single rotary valve and may reduce the size and complexity of the fryer, improve performance, and/or reduce cost of automatic filtration systems. Further, the disclosed embodiments overcome problems that may arise in components related to motion of the rotary valve through the use of a rotary position sensor that is configured to sense an angular position of the rotary valve without making mechanical contact with the rotary valve.

A cooking apparatus including at least one cooking medium source, one or more cooking vessels, a cooking medium receptacle, and a plumbing system, is disclosed. The cooking medium receptacle is configured to receive and store used cooking media to be discarded, and the plumbing system is configured to transport the cooking medium between the cooking medium source, the one or more cooking vessels, and the cooking medium receptacle. The cooking apparatus further includes a rotary valve controlling flow through the plumbing system and having at least one rotary inlet and a plurality of rotary outlets. The at least one rotary inlet is configured to be in fluid communication with the at least one cooking medium source, one or more of the plurality of rotary outlets are configured to be in fluid communication with the corresponding one or more cooking vessels, and a rotary outlet is configured to be in fluid communication with the cooking medium receptacle.

The cooking apparatus further includes a rotary position sensor and a controller. The rotary position sensor generates a signal, having continuous angular position resolution, based on an angular position of the rotary valve. The controller receives the signal generated by the rotary position sensor and selectively places the rotary inlet in fluid communication with one of the plurality of rotary outlets based on the signal generated by the rotary position sensor. The rotary position sensor may further include a Hall-Effect sensor that provides accurate readings of the angular position of the rotary valve while operating in environments at temperatures up to 400° F.

The cooking apparatus may further include a temperature sensor mounted in the rotary valve that determines a temperature of the cooking medium that flows through the rotary valve. The cooking apparatus may further include one or more temperature sensors that measure temperature of the cooking medium at one or more corresponding first locations within the plumbing system, and one or more heating elements located within the plumbing system that provide heat to the cooking medium at one or more corresponding second locations within the plumbing system. The controller receives signals from one or more temperature sensors and provides signals to the one or more heating elements to control temperature within the plumbing system based on the signals received from the one or more temperature sensors according to a predetermined temperature profile.

The cooking apparatus may further include a filtration system that is in fluid communication with the one or more cooking vessels. The filtration system is configured to receive and filter used cooking media from the one or more cooking vessels and to provide the filtered cooking media to the rotary inlet as the cooking medium source. The controller is further configured to control movement of the cooking medium through the plumbing system and to control the filtration system to perform a filtration operation.

A method of transferring a cooking medium to various parts of a cooking apparatus is disclosed. The method includes detecting an angular position of a rotary valve, rotating the rotary valve to selectively position a rotary inlet of the rotary valve in fluid communication with one of a plurality of rotary outlets based on the detected angular position, and transferring the cooking medium from a cooking medium source that is in fluid communication with the rotary inlet to a destination receptacle that is fluid communication with one of the plurality of rotary outlets.

The method further includes detecting an angular position of the rotary valve using a rotary position sensor that generates a signal, having continuous angular position resolution, based on the angular position of the rotary valve and that senses angular position of the rotary valve without making mechanical contact with the rotary valve. The method may further include detecting an angular position of the rotary valve using a Hall-Effect sensor that provides accurate readings of the angular position of the rotary valve while operating in environments at temperatures up to 400° F.

The method may further include controlling a temperature within a plumbing system of the cooking apparatus according to a predetermined temperature profile. The method includes measuring a temperature of the cooking medium at one or more first locations within the plumbing system of the cooking apparatus, and proving heat to one or more second locations within the plumbing system of the cooking apparatus based on the measured temperatures at the first plurality of locations.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

Further embodiments, features, and advantages, as well as the structure and operation of the various embodiments, are described in detail below with reference to the accompanying drawings.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention. In the drawings, like reference numbers generally indicate identical, functionally similar, and/or structurally similar elements.

DETAILED DESCRIPTION

Embodiments of the invention are directed to systems and methods of controlling a fryer, and in particular, such that a recirculation process performed by a cooking medium handling system is capable of serving multiple fry pots and/or cooking chambers with the same equipment. In order to improve the accuracy and reliability of such systems, Hall-effect sensors and temperature sensors are used with the control of elements such as valves to assure that the cooking medium is routed to and from the flow paths in the plumbing that are desired. Therefore, problems with incorrect valve and/or recirculation system operation can be avoided.

Figure 1:
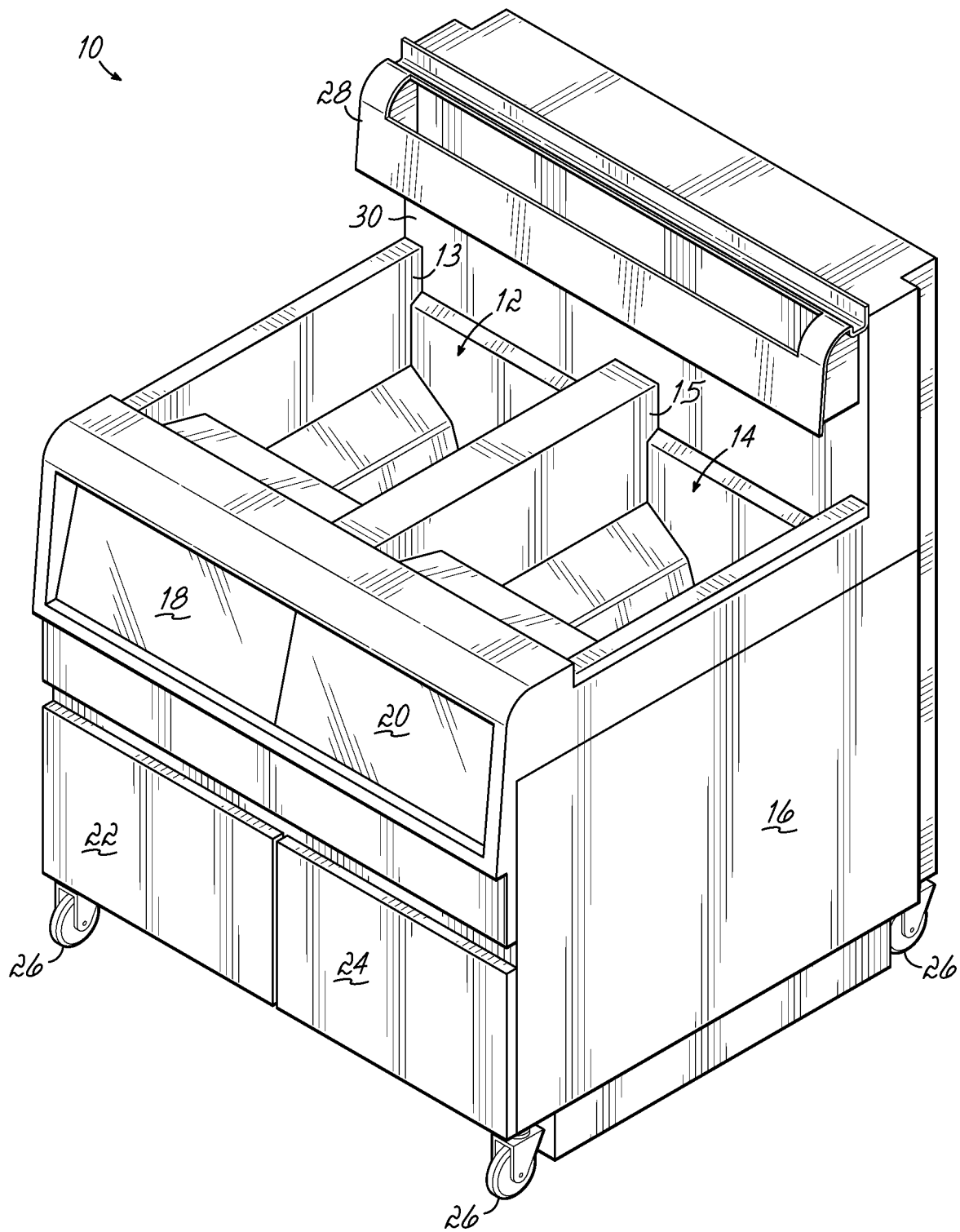
FIG. 1 is a top perspective view of a fryer according to an embodiment of the invention.

Referring now to the figures, FIG. 1 depicts an exemplary fryer 10 in accordance with an embodiment of the invention. The fryer 10 includes fry pots 12, 14, a cabinet 16, control panels 18, 20, access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. Each fry pot 12, 14 includes a respective opening 13, 15 though which a food product may be placed into the fryer 10.

Food products may be placed into the fry pots 12, 14, for example, by lowering a basket containing the food product into the fry pot 12, 14. At completion of a cooking cycle, the basket may be removed from the fry pot 12, 14 and hung from the basket hanger 28 to allow excess cooking medium to drain back into the fry pot 12, 14. Each of the fry pots 12, 14 may be associated with a corresponding one of the control panels 18, 20 to provide a human-machine interface for operating the fryer 10. The control panels 18, 20 may receive commands from, and display information regarding a status of the fryer 10 to an operator. The access panels 22, 24 may provide access to the interior of cabinet 16 to, for example, service internal components of the fryer 10.

Exemplary fryer 10 is depicted as having a separate control panel 18, 20 for each fry pot. However, it should be understood that one control panel could be configured to control multiple fry pots, and embodiments of the invention are not limited to fryers having a separate control panel for each fry pot. In addition, although the fryer 10 depicted in FIG. 1 is a gas-heated open fryer having two fry pots, it should be further understood that embodiments of the invention may also be used with pressure fryers and/or electrically heated fryers, as well as fryers having a different number of fry pots.

Figure 2:
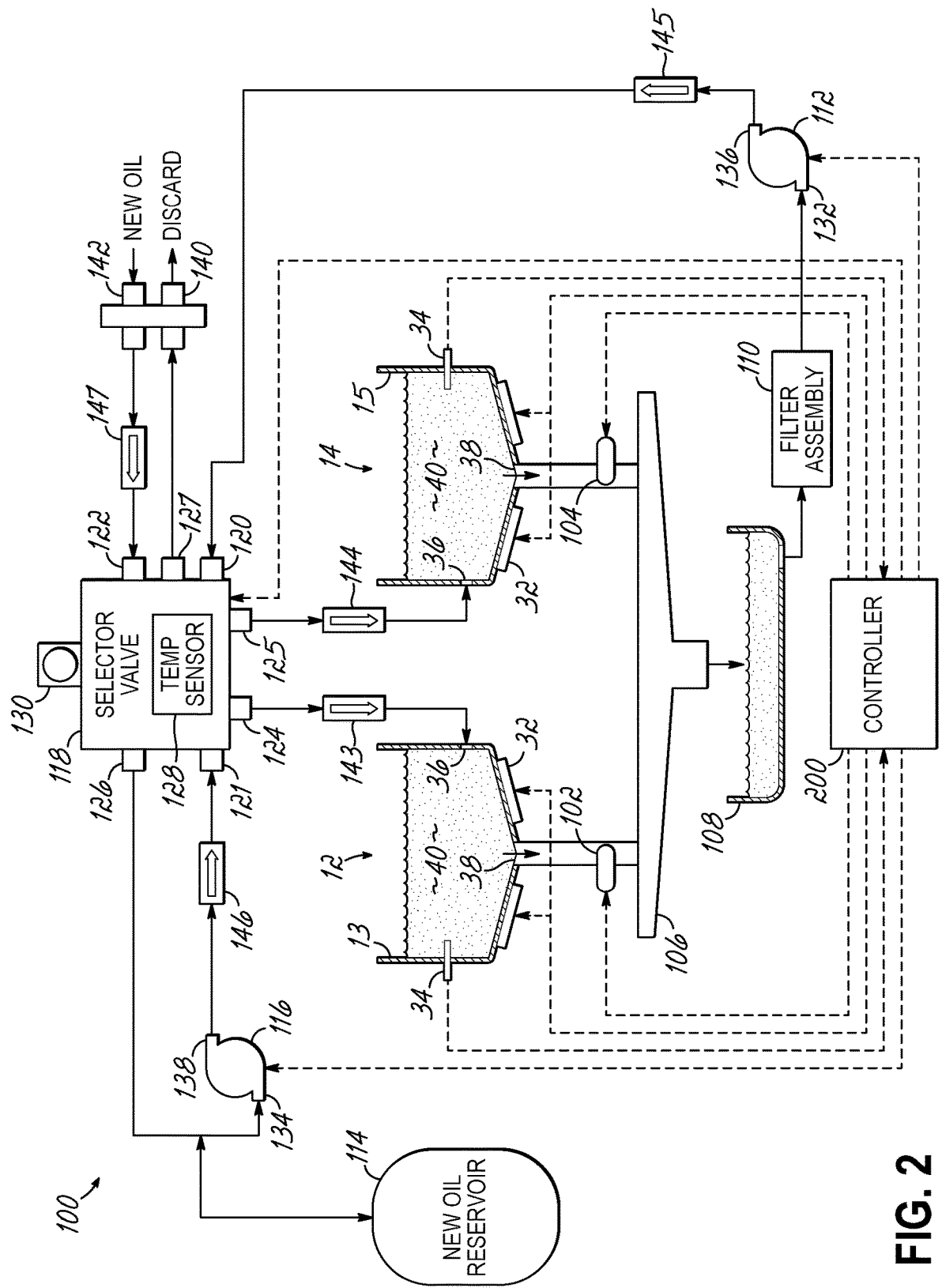
FIG. 2 is a diagrammatic view of the fryer of FIG. 1 depicting a plurality of fry pots, a filtration system, and a controller.

FIG. 2 is a diagrammatic view of the fryer of FIG. 1 depicting a plurality of fry pots, a filtration system, and a controller, according to an embodiment. In addition to fry pots 12, 14, the fryer 10 may include a cooking medium handling system 100 and a controller 200. Each fry pot 12, 14 may include a heating element 32 (schematically shown), a temperature sensor 34, a fill port 36, and a drain port 38, and may be at least partially filled with a cooking medium 40. Suitable cooking mediums may include plant-based fats, animal-based fats, and/or synthetic (e.g., hydrogenated) fats. The heating element 32 may be disposed within or proximate to the fry pot 12, 14 for heating the cooking medium 40. The heating element 32 may include an electrical heating element (e.g., a heating coil immersed in the cooking medium 40) or a gas heating element (e.g., a gas burner and heat exchanger that transfers heat from the burner to the cooking medium 40).

The cooking medium handling system 100 may include drain valves 102, 104, a drain manifold 106, a drain pan 108, a filter assembly 110, a filter pump 112, a reservoir 114 of fresh cooking medium, a reservoir pump 116, and a selector valve 118. The selector valve 118 may include a plurality of input ports 120-122 and a plurality of output ports 124-127. A temperature sensor 128 may be located in the selector valve 118, or in another suitable location, to enable the controller 200 to determine the temperature of the cooking medium passing through the cooking medium handling system 100.

The selector valve 118 is configured to selectively fluidically couple one or more of the input ports 120-122 to one or more of the output ports 124-127. To this end, the selector valve 118 may comprise a rotary valve having a transverse plug (not shown) coupled to a motor 130. The motor 130 may cause the selector valve 118 to fluidically couple a selected input port to a selected output port by rotating the transverse plug to one of a plurality of predetermined positions. In an alternative embodiment of the invention, the selector valve 118 may comprise an assembly of valves that are configured to provide the desired selective fluidic coupling in response to signals from the controller 200. In this alternative embodiment, the selector valve 118 may comprise an assembly including a plurality of valves connected to a manifold.

The filter pump 112 and reservoir pump 116 may each include an inlet 132, 134 on a suction side of the pump, and an outlet 136, 138 on a pressure side of the pump. The inlet 132 of filter pump 112 may be fluidically coupled to the drain pan by the filter assembly 110, and the outlet 136 of the filter pump 112 may be fluidically coupled to an input port 120 of selector valve 118. Activation of the filter pump 112 may cause cooking medium 40 to be drawn from the drain pan 108 through the filter assembly 110 and provided to selector valve 118. The selector valve 118 may in turn provide the filtered cooking medium 40 to one of the fry pots 12, 14 for reuse and/or to a discard port 140 for disposal.

Although filter assembly 110 is depicted as being coupled to the inlet 132 of filter pump 112 in the exemplary embodiment illustrated by FIG. 2, it should be understood that the cooking medium handling system 100 is not limited to the specific arrangement of components depicted. For example, the filter assembly 110 could be coupled to the outlet 136 of filter pump 112 rather than the inlet 132 so that cooking medium 40 is pushed through the filter assembly 110 rather than drawn through the filter assembly 110. In either case, the filter assembly 110 may include a housing configured to accept a filter for filtering the cooking medium 40. Regular use of filtration cycles to clean the cooking medium 40 may reduce consumption of cooking medium 40 and increase the availability of the fryer 10 by providing hot filtered cooking medium 40 to the fry pots 12, 14.

The inlet 134 of reservoir pump 116 may be fluidically coupled to the reservoir 114, and the outlet 138 of the reservoir pump 116 may be fluidically coupled to an input port 121 of selector valve 118. Activation of reservoir pump 116 may cause cooking medium 40 to be drawn from reservoir 114 and provided to selector valve 118. The selector valve 118 may in turn provide the fresh cooking medium 40 to one of the fry pots 12, 14 to refill or replenish the cooking medium 40. A fill port 142 may be coupled to an input port of the selector valve 118 to facilitate the addition of cooking medium 40 to the reservoir 114. The cooking medium handling system 100 may further include check valves 143-147 that prevent cooking medium 40 from back-flowing from the fry pots 12, 14 into the selector valve 118, or from the selector valve 118 into any of the filter pump 112, reservoir pump 116, or fill port 142.

The controller 200 may be in communication with the heating element 32 and temperature sensor 34 of each of the fry pots 12, 14, the drain valves 102, 104, filter pump 112, reservoir pump 116, and temperature sensor 128 and motor 130 of selector valve 118. The controller 200 may control the various cooking and maintenance cycles of the fryer 10 by transmitting signals to, and receiving signals from these components of the fryer 10. The controller 200 may also be coupled to the control panels 18, 20 to provide operating information to, and receive input from the operator of the fryer 10. The controller 200 may control the temperature of the cooking medium 40 in each fry pot 12, 14 by selectively activating the respective heating element 32, and may control the filtering and addition of cooking oil by selectively activating the drain valves 102, 104, filter pump 112, reservoir pump 116, and motor 130 of selector valve 118.

Figure 3:
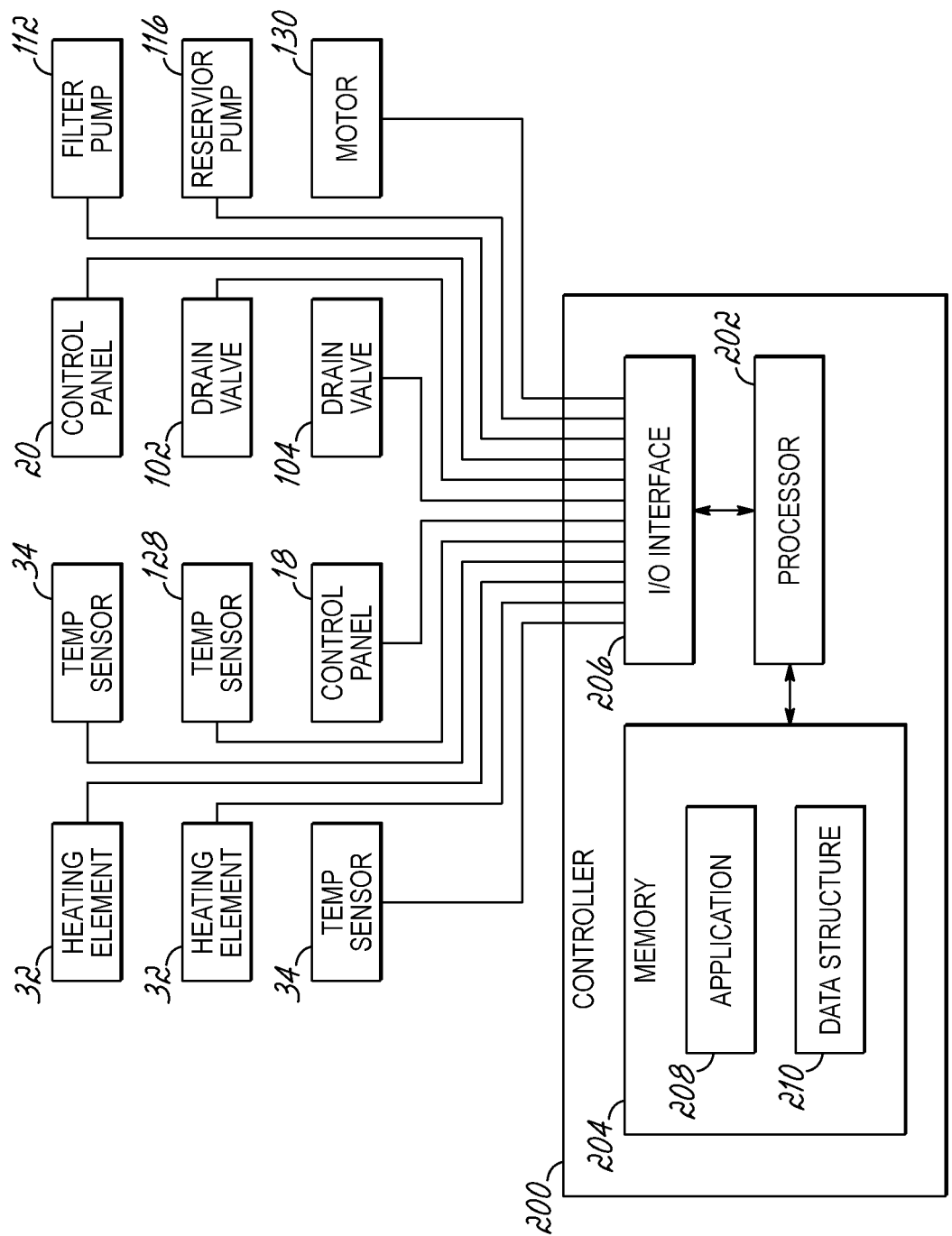
FIG. 3 is a diagrammatic view of the controller of FIG. 2.

FIG. 3 is a diagrammatic view of the controller of FIG. 2. The controller 200 may include a processor 202, a memory 204, and an input/output (I/O) interface 206. The processor 202 may include one or more devices configured to manipulate signals and/or data based on operational instructions that are stored in memory 204. Memory 204 may include a single memory device or a plurality of memory devices configured to store information in the form of data. The memory 204 may store computer program code embodied as one or more computer software applications comprising instructions executed by the processor 202, such as a controller application 208. One or more data structures 210 may also reside in memory 204, and may be used by the processor 202 and/or controller application 208 to store and process data.

The I/O interface 206 operatively couples the processor 202 to other components of the fryer 10, such as control panels 18, 20, heating elements 32, temperature sensors 34, 128, drain valves 102, 104, filter pump 112, reservoir pump 116, and motor 130 of selector valve 118. The I/O interface 206 may include signal processing circuits that condition incoming and outgoing signals so that the signals are compatible with both the processor 202 and the components to which the processor 202 is coupled. To this end, the I/O interface 206 may include analog-to-digital (A/D) and/or digital-to-analog (D/A) converters, voltage level and/or frequency shifting circuits, optical isolation and/or driver circuits, data busses, and/or any other analog or digital circuitry suitable for coupling the processor 202 to the other components of the cooking apparatus.

The control panels 18, 20 may be operatively coupled to the processor 202 of controller 200 to provide a user interface that allows the operator to interact with the controller 200. The control panels 18, 20 may include a display having suitable audio and visual indicators capable of providing information to the operator. The control panels 18, 20 may also include input devices and controls capable of accepting commands or input from the operator and transmitting the entered input to the processor 202. In this way, the control panels 18, 20 may enable manual initiation or selection of system functions, for example, during set-up of the fryer 10.

Figure 4A:
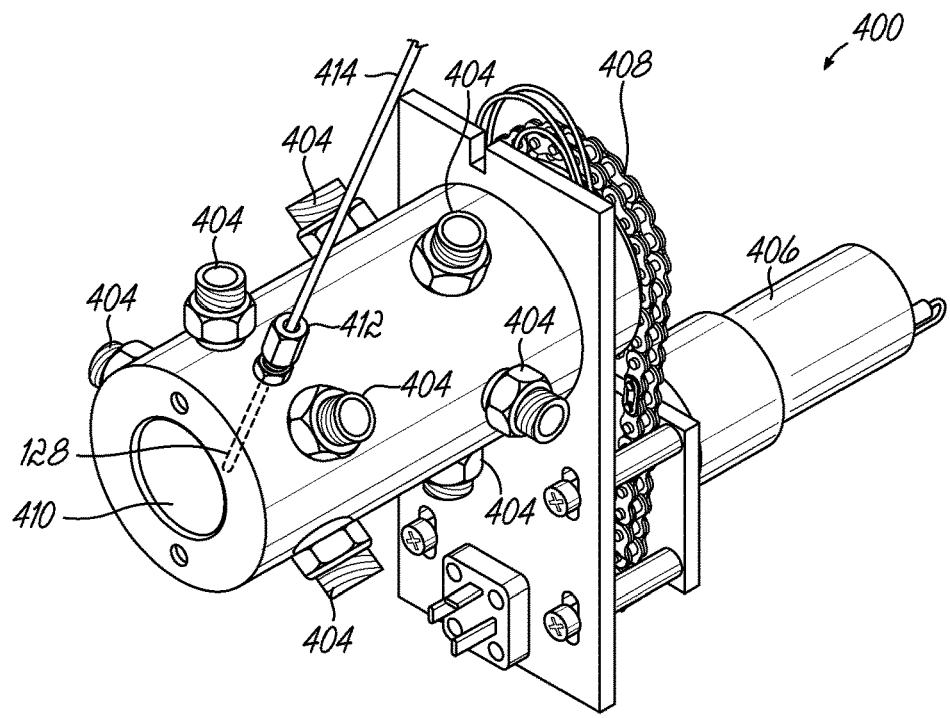
FIG. 4A is a perspective view of a rotary valve, according to an embodiment.
Figure 4B:
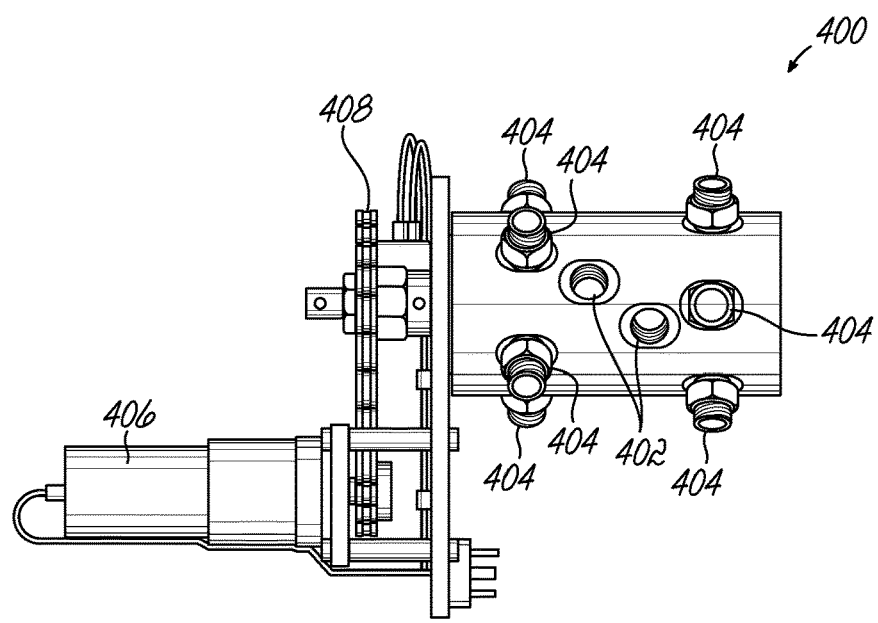
FIG. 4B is a side view of the rotary valve of FIG. 4A.

FIGS. 4A and 4B illustrate two views of a rotary valve 400 in accordance with one embodiment of the invention. Rotary valve 400 may include a stationary hollow outer cylinder with one or more fluid inlet ports 402 and one or more fluid outlet ports 404. Inlet ports 402 may be selectable or may converge to form a single inlet port. Rotary valve 400 may be configured with a rotating inner cylinder (not shown in FIGS. 4A and 4B) with channels to coincide with different outlet ports 404 as the inner cylinder rotates. As such, rotary valve 400 may be operated to selectively connect one or more inlet ports 402 with one or more outlet ports 404. The inner cylinder may be rotated by a motor 406 (e.g., a direct current (DC) motor). Additionally, the inner cylinder may be rotated by a solenoid engaging a cam, a stepper motor, or any other mechanism to rotate the inner cylinder.

The motor 406 may be operatively coupled to the inner cylinder by a transmission 408, for example, a system of gears, chains, and/or belts. As the inner cylinder is rotated, one or more of outlet ports 404 may be selected and placed in fluid communication with one or more inlet ports 402. Although prior versions of rotary valve included cams and other mechanical switches for position sensing, the rotary valve 400 of this embodiment is advantageously configured to operate with position sensing equipment that enables continuous angular position resolution so as to be confident the correct inlet port 402 is communicating with the correct outlet port 404 for a given operational state.

In this example, rotary valve 400 may further comprise a temperature sensor 128 that resides within an internal volume 410 of the rotary valve 400. The temperature sensor 128 may be mounted to the stationary hollow outer cylinder with a coupling 412. The temperature sensor 128 may be coupled to the controller 200 by a conducting cable 414 that transmits to the controller 200 a signal that is generated by the temperature sensor 128, which may be used for various heat control purposes. The temperature sensor 128 measures a common temperature of cooking media flowing through the rotary valve 400 from one or more inlet ports 402 to the one or more outlet ports 404. It will be understood and also described further below that the temperature sensor 128 may be duplicated and/or repositioned in different receptacles and locations in the plumbing of the fryer, so as to provide additional information to the controller 200.

Figure 5:
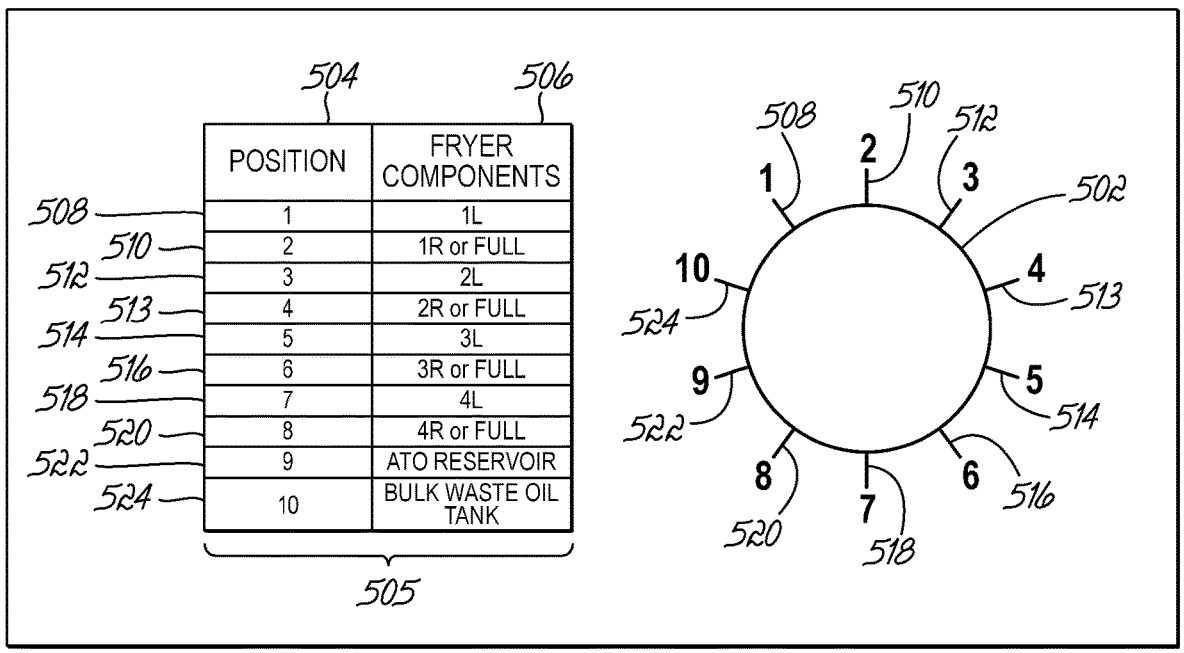
FIG. 5 illustrates a set of positions of an inner cylinder within a rotary valve, such as the valve shown in FIGS. 4A and 4B.

FIG. 5 illustrates a set of positions of an inner cylinder within a rotary valve, such as the rotary valve 400 described above, for example. An inner cylinder 502 of a rotary valve 400 may be provided in a fryer containing four cooking vessels (not shown). Inner cylinder 502 may rotate to at least ten discrete positions 504 as summarized in table 505. Each position 504 may correspond to an outlet port 404 of rotary valve 400. Because each outlet port 404 may be connected to a component of a fryer, each position 504 of inner cylinder 502 may be mapped to a specific component 506 of a fryer. In table 505, positions 504 are mapped to specific components 506 of the fryer. For example, when inner cylinder 502 is in first position 508, an outlet port 404 may be in fluid communication with a left vat of the first vessel of the fryer. Similarly, when inner cylinder 502 is in sixth position 516, an outlet port 404 may be in fluid communication with the right vat of the third vessel. In some embodiments, tenth position 524 of inner cylinder 502 may correspond to a receptacle of waste cooking medium and also may be the "home" or default position of rotary valve 400. However, it will be understood that these particular fryer component associations with the positions 504 in table 505 are but one example of the configurations that can be used when connecting the rotary valve 400 in position in the cooking medium handling system 100 of a fryer.

As initially set forth above, problems associated with mechanical systems for determining the rotary position of rotary valve 400 are overcome by the disclosed embodiments, as described in further detail below. The disclosed embodiments provide a rotary position sensor that is configured to sense an angular position of the rotary valve without making mechanical contact with the rotary valve. In this regard, a Hall-effect sensor determines a position of a magnetic field source residing on the rotary valve. The disclosed position sensor is configured to function properly at elevated temperatures associated with the cooking medium during operation of the cooking apparatus. For example, operating temperatures of the cooking medium in commercial fryers are typically in the range from 350° F. to 375° F. and may range as high as 400° F. Most commercially available Hall-effect sensors would typically fail when trying to operate in environments with such temperatures. Even though one would normally be led to mechanical sensors or other solutions for tracking the position of the rotary valve 400 in view of the environment provided at a fryer, the current embodiments achieve advantageous functionality by making the Hall-effect sensor(s) work within this environment.

Figure 6:
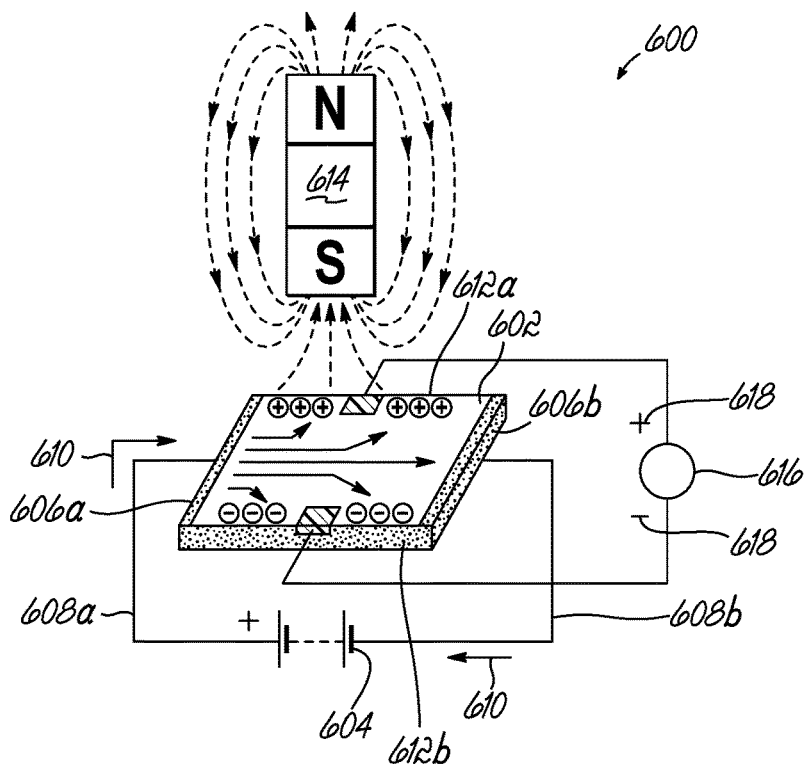
FIG. 6 is a schematic illustration of the operation of a Hall-effect device for sensing magnetic fields, according to an embodiment.

FIG. 6 is a schematic illustration 600 of the operation of a Hall-effect device for sensing magnetic fields, according to an embodiment. The Hall-effect is based on a fundamental interaction between a magnetic field and charge carriers flowing in a flat rectangular material. In this example, the Hall-effect device or sensor 602 is a flat solid piece of material (at 602) that conducts electricity with application of an applied voltage. For example, a source 604 of direct current (DC) voltage is connected to opposite edges, 606a and 606b, of the material 602 through wires 608a and 608b to apply a voltage difference between opposite edges, 606a and 606b. The applied DC voltage induces a DC current 610 that flows through the material 602.

In the presence of a magnetic field source, charge carriers flowing in the material 602 are deflected to opposite edges, 612a and 612b, due to the well-known Lorentz force. The Hall-effect refers to an induced voltage between edges 612a and 612b that arises from charge that builds up on opposite edges, 612a and 612b due to the deflection of charge carriers in the presence of the magnetic field. In this example, magnet 614 generates a magnetic field that gives rise to the Hall voltage 616. In this example, magnet 614 is oriented with its north pole directed away from the material 602 and its south pole directed toward the material 602. As such, a magnetic field pointing perpendicular to the plane of the material 602 is generated that points toward the magnet 614. In this field, positive charge carriers are deflected toward edge 612a while negative charge carriers are deflected toward edge 612b to generate a Hall-effect voltage with indicated polarity 618 with a positive voltage developing at edge 612a and a negative voltage developing at edge 612b.

As described above, the Hall-effect provides a position sensor that determines the presence of a magnetic field source. A linear Hall-effect sensor generates a Hall-effect voltage that depends linearly on the magnetic field strength. Thus, as magnet 614 moves closer to the Hall-effect sensor 602, the Hall-effect voltage increases continuously, and as magnet 614 moves away from Hall-effect sensor 602, the Hall-effect voltage decreases continuously. Thus, as described in greater detail below, a Hall-effect sensor may be used to provide a rotary position sensor that generates a signal, having continuous angular position resolution, based on an angular position of the rotary valve. In further embodiments, if detection of discrete angular positions (e.g., positions 508-524 in FIG. 5) is desired, a plurality of digital Hall-effect sensors that provide a binary output signal, in response to the presence of magnetic fields having field strength above or below a predetermined threshold, may be employed.

Figure 7A:
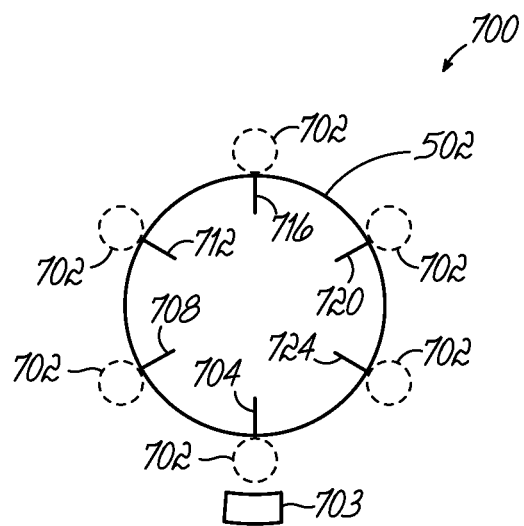
FIG. 7A is a schematic illustration of a configuration in which a Hall-effect sensor is used to determine an angular position of a magnetic field source, which may be used with the valve shown in FIGS. 4A and 4B.
Figure 7B:
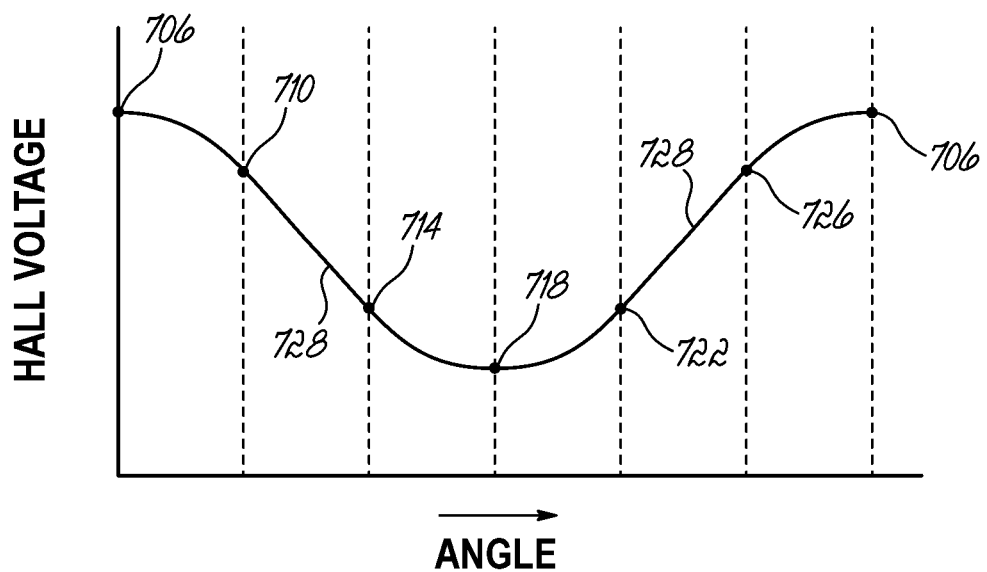
FIG. 7B is a schematic illustration of a Hall-effect voltage vs. angular position of a magnetic field source, in accordance with the example shown in FIG. 7A.

FIGS. 7A and 7B illustrate the use of a Hall-effect sensor as a rotary position sensor that generates a signal, having continuous angular position resolution. In this example, a magnetic field source 702 is attached to an inner cylinder 502 of a rotary valve 400 and is in close proximity to a Hall-effect sensor 703. The magnetic field source 702 may be a magnet 614 or a current carrying wire (or coil of wire) that generates a magnetic field. In this example, magnetic field source 702 is illustrated in a first angular position 704 that may be a home position of the inner cylinder 502 of the rotary valve. In this configuration, a first value 706 of the Hall-effect voltage is generated, as illustrated in FIG. 7B.

Upon rotation of the inner cylinder 502, the magnetic field source 702 moves to a new angular position 708. In this configuration, the distance between the magnetic field source 702 and the Hall-effect sensor 703 is increased relative to that in the configuration in which the magnetic field source 702 was placed at angular position 704. The increased distance leads to a weaker magnetic field strength that is detected by the Hall-effect sensor 703 which, in turn, leads to a reduced Hall-effect voltage 710 as shown in FIG. 7B. Similarly, as the magnetic field source 702 is moved to positions 712, 716, 720, and 724, the Hall-effect sensor provides output voltages having values 714, 718, 722, and 726, as shown in FIG. 7B. Returning the magnetic field source 702 to the starting angular position 704 returns the Hall-effect voltage to its initial value 706.

Although, discrete angular positions are shown in the example of FIGS. 7A and 7B, it must be emphasized that the voltage output from a linear Hall-effect sensor produces a voltage output that changes continuously with angular position as indicated by the solid, continuous curve 728 in FIG. 7B. As shown, FIG. 7B provides ambiguous angular information in the sense that angular positions in the positive and negative sense (e.g., 712 and 720) with respect to the home position 704 produce similar output voltages 714 and 722 based on these angular positions being equidistant in actual linear distance from the Hall-effect sensor 602. Thus, without further information beyond the sensor output in the abstract, only the magnitude of the angular displacement relative to the home position 704 would be identified by sensor 703.

The controller 200, however, has additional information in that is knows in which direction the rotary valve is being displaced. In the example of FIGS. 7A and 7B, a preferred direction of angular displacement (i.e., clockwise) has been chosen. As such, the angular position may be uniquely identified as indicated by the graph in FIG. 7B. For example, if the inner cylinder 502 is being rotated in a clockwise sense, as in the example of FIGS. 7A and 7B, the angular position may be determined based on whether the voltage is increasing or decreasing. For example, while rotating the inner cylinder 502 in a clockwise sense, the decreasing voltage readings 706, 710, 714, and 718, indicate angular positions 704, 708, 712, and 716 that fall on the left-hand side of the inner cylinder 502 in FIG. 7A, and correspond to angles having values between 0° and 180° relative to the home position 704. Similarly, while rotating the inner cylinder 502 in a clockwise sense, the increasing voltage readings 718, 722, 726, and 706 indicate angular positions 716, 720, 724, and 704 that fall on the right-hand side of inner cylinder 502 in FIG. 7A and correspond to angles having values between 180° and 360°.

The accuracy of angular position detection depends on the sensitivity with which small changes of voltage may be detected. A simple experimental procedure may be employed to determine the detection sensitivity and a calibration may be performed to associate angular position values with a voltage vs. angle curve such as that illustrated in FIG. 7B. If greater accuracy is needed, embodiments that employ a plurality of Hall-effect sensors may be used, as described below.

Figure 8A:
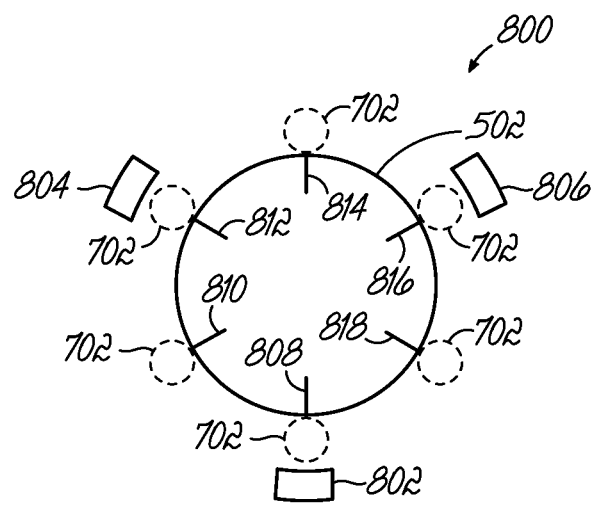
FIG. 8A is a schematic illustration of a configuration in which three Hall-effect sensors are used to determine an angular position of a magnetic field source, according to another embodiment that may be used with the valve shown in FIGS. 4A and 4B.
Figure 8B:
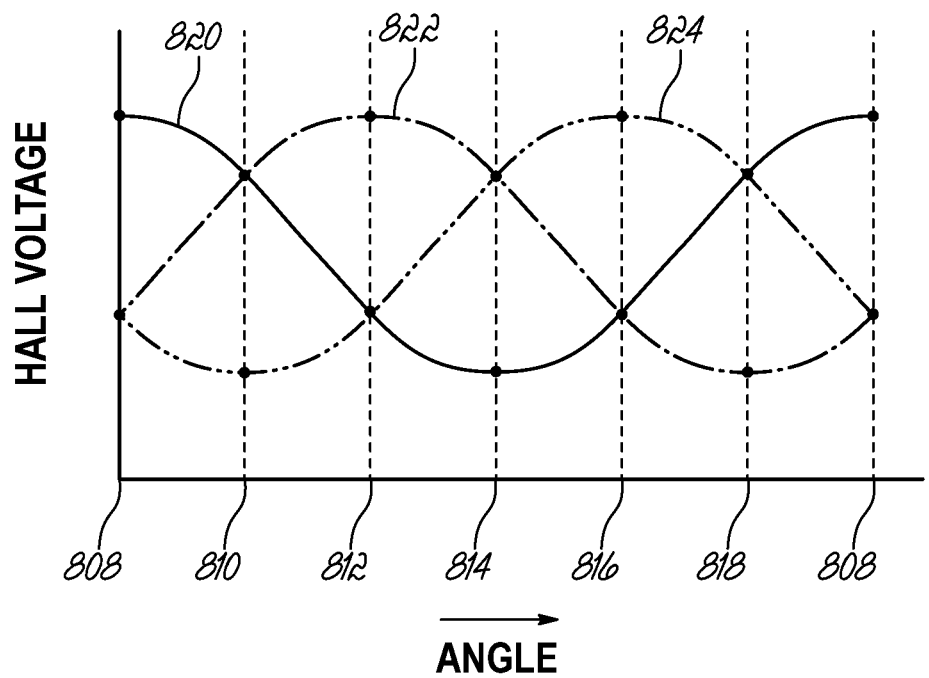
FIG. 8B is a schematic illustration of Hall-effect voltages vs. angular position generated by the three sensors of FIG. 8A.

To this end, another embodiment of sensors that may be used with the rotary valve 400 is shown in FIGS. 8A and 8B. FIGS. 8A and 8B illustrate the use of a plurality of Hall-effect sensors to provide a rotary position sensor having greater accuracy, according to an embodiment. FIG. 8A shows a configuration 800 in which three Hall-effect sensors, 802, 804, and 806, are used to detect an angular position of a magnetic field source 702 at various angular positions 808, 810, 812, 814, 816, and 818. FIG. 8B shows corresponding Hall-effect voltages vs. angular position generated by the three sensors of FIG. 8A. Hall-effect sensor 802 produces the voltage vs. angular position curve 820, sensor 804 produces voltage vs. angular position curve 822, and sensor 806 produces voltage vs. angular position curve 824.

FIG. 8B illustrates a situation in which similar sensors having similar output voltage characteristics are used for sensors 802, 804, and 806. Voltage vs. angular position curves 820, 822, and 824 are displaced copies of one another as can be seen based on considerations of the symmetrically placed positions of sensors 802, 804, and 806. A simple experimental procedure may be used to set up a calibration to associate angular position values with the three voltage vs. angle curves illustrated in FIG. 8B. In this way, the rotational position sensor of FIG. 8A may be used to obtain a unique identification of the angular position of inner cylinder 502 without further information such as the specific direction in which the inner cylinder 502 is being rotated, in contrast to the situation of the embodiment shown in FIGS. 7A and 7B. Likewise, as the output of Hall-effect sensors are sometimes affected by high ambient temperatures, the use of multiple sensors 802, 804, and 806 can help correct for any temperature-based inaccuracies and provide the redundancy required to still achieve accurate position determinations with continuous angular resolution.

The above-described embodiments simplify the plumbing system of cooking medium handling system 100 through the use of a rotary valve 400 to serve multiple cooking chambers in a single system. Moreover, the disclosed non-contact angular position sensors provide an advantageous operation whereby the exact rotational position of the rotary valve 400 is confirmed at all times, without being negatively impacted by things like mechanical wear of components and/or environmental conditions such as ambient oil or water vapors and high temperatures. The plumbing system may further be improved by including temperature sensors and heating elements throughout the various hoses, pipes, pumps, valves, etc., of system 100 (see FIG. 2), in addition to the heating elements 32 and temperature sensors 34 and 128 described above.

For example, it may be advantageous, in some cooking apparatus, to use cooking media that is solid (e.g., shortening) at room temperature. Therefore, it is necessary in such embodiments to embed heaters and temperature sensors throughout the plumbing system so that an appropriate amount of heat may be added at startup to ensure that the cooking medium is properly melted and capable of flow throughout the system (the temperature sensors help monitor when such melting has occurred). In other operations, the temperature of cooking media may be monitored as it flows through the system. As hot cooking media is removed from fry pots, 12 and 14 (e.g., see FIG. 2), for example, a temperature sensor may sense a dropping temperature when the transition from 300° F.+ degree oil is replaced with ~100° F. air. This transition may be detected using a controller algorithm and the controller may therefore automatically determine whether the system was pumping oil or air into fry pots 12 and 14.

Further, in a filtering operation, as cooking media is filtered, the cooking media may be significantly cooled by flowing through the drain manifold 106 and filtration system, particularly when those elements are not heated. As the cooking media flows back to the fry pots, 12 and 14, it would be advantageous to know the temperature of cooking media that is being returned to the fry pots, 12 and 14, and to add heat to the returning cooking media as needed to thereby reduce downtime before a new cooking cycle can begin. Thus, it is desirable to have a plurality of temperature sensors and heaters throughout the plumbing system so that the controller 200 may generate a desired temperature profile throughout the system 100.

Figure 9:
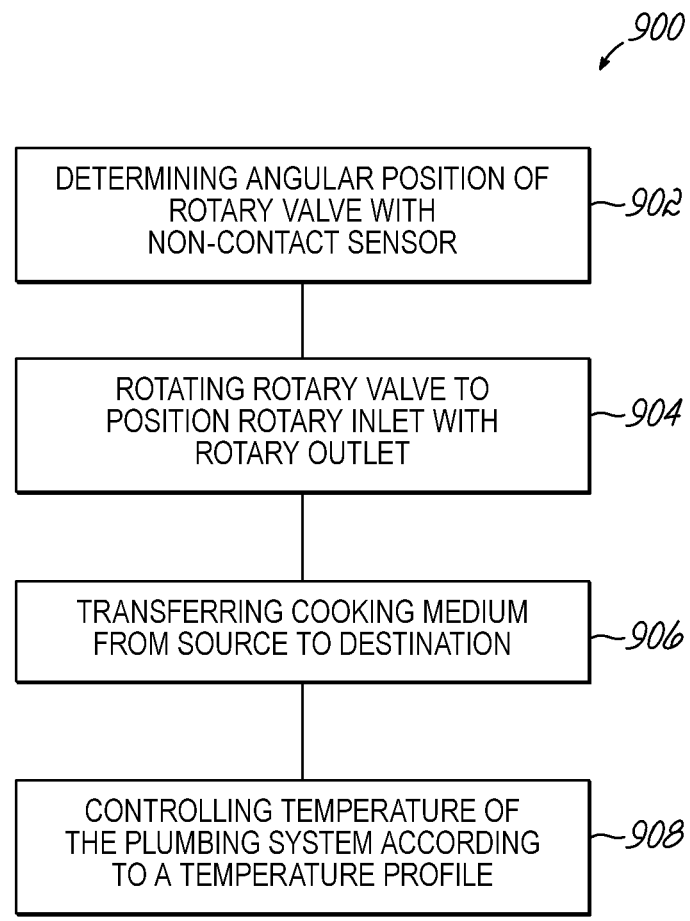
FIG. 9 is a flowchart illustrating a method of operating a cooking apparatus, including transferring a cooking medium to various parts of the cooking apparatus.

FIG. 9 is a flowchart illustrating a method 900 of transferring a cooking medium to various parts of a cooking apparatus, such as the cooking apparatus 10 of FIG. 2. It will be understood that the following actions are actuated by the controller 200, in one embodiment. The method includes determining (at block 902) an angular position of the rotary valve 400, rotating (at block 904) the rotary valve to selectively position a rotary inlet 402 of the rotary valve in fluid communication with one of a plurality of rotary outlets 404 based on the detected angular position, and transferring (at block 906) the cooking medium from a cooking medium source that is in fluid communication with the rotary inlet to a destination receptacle that is in fluid communication with one of the plurality of rotary outlets.

The stage of determining 902 an angular position of a rotary valve may further include determining an angular position of the rotary valve using a rotary position sensor that generates a signal, having continuous angular position resolution, based on the angular position of the rotary valve. The method may further include determining the angular position of the rotary valve by using a sensor that determines angular position without making mechanical contact with the rotary valve. The method may further include determining 902 an angular position of the rotary valve using a Hall-Effect sensor that functions at elevated operating temperatures associated with the cooking medium.

The method may further include controlling (at block 908) a temperature within the plumbing system of the cooking apparatus according to a predetermined temperature profile. The method includes measuring a temperature of the cooking medium at a first plurality of locations within the plumbing system of the cooking apparatus, and proving heat to a second plurality of locations within the plumbing system of the cooking apparatus based on the measured temperatures at the first plurality of locations.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically includes computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions stored thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes," "having," "has," "with," "comprised of," or variants thereof are used in either the detailed description or the claims, such terms are intended to be inclusive in a manner similar to the term "comprising."

While all of the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A cooking apparatus, comprising:
   at least one cooking medium source;
   one or more cooking vessels;
   a cooking medium receptacle configured to receive and store used cooking medium to be discarded;
   a plumbing system configured to transport cooking medium between the at least one cooking medium source, the one or more cooking vessels, and the cooking medium receptacle;
   a rotary valve controlling flow through the plumbing system, and comprising:
      at least one rotary inlet configured to be in fluid communication with the at least one cooking medium source;
      one or more rotary outlets configured to be in fluid communication with the corresponding one or more cooking vessels; and
      a rotary outlet configured to be in fluid communication with the cooking medium receptacle;
   a rotary position sensor that generates a signal, having continuous angular position resolution, based on an angular position of the rotary valve,
      wherein the rotary position sensor is configured to sense an angular position of the rotary valve without making mechanical contact with the rotary valve; and
   a controller that selectively places the at least one rotary inlet in fluid communication with one of the rotary outlets based on the signal generated by the rotary position sensor.

2. The cooking apparatus of claim 1, wherein the rotary position sensor further comprises a Hall-effect sensor that determines a position of a magnetic field source residing on the rotary valve, to thereby determine the angular position of the rotary valve.

3. The cooking apparatus of claim 2, wherein the magnetic field source comprises a magnet.

4. The cooking apparatus of claim 2, wherein the magnetic field source comprises a current carrying wire.

5. The cooking apparatus of claim 2, wherein the rotary position sensor provides accurate readings of the angular position of the rotary valve while operating in environments at temperatures up to 4000 F.

6. The cooking apparatus of claim 1, wherein the rotary position sensor further comprises a plurality of Hall-effect sensors that determine a position of a magnetic field source on the rotary valve, to thereby determine the angular position of the rotary valve.

7. A cooking apparatus, comprising:
at least one cooking medium source;
one or more cooking vessels;
a cooking medium receptacle configured to receive and store used cooking medium to be discarded;
a plumbing system configured to transport cooking medium between the at least one cooking medium source, the one or more cooking vessels, and the cooking medium receptacle;
a rotary valve controlling flow through the plumbing system, and comprising:
at least one rotary inlet configured to be in fluid communication with the at least one cooking medium source,
one or more rotary outlets configured to be in fluid communication with the corresponding one or more cooking vessels; and
a rotary outlet configured to be in fluid communication with the cooking medium receptacle;
a rotary position sensor that generates a signal, having continuous angular position resolution, based on an angular position of the rotary valve;
a controller that selectively places the at least one rotary inlet in fluid communication with one of the rotary outlets based on the signal generated by the rotary position sensor; and
a temperature sensor mounted in an internal volume of the rotary valve that determines a temperature of fluid in the form of air or the cooking medium that flows through the rotary valve, to assess a source of the fluid and whether the fluid is in the form of air or cooking medium.

8. The cooking apparatus of claim 1, further comprising: one or more temperature sensors that measure temperature of the cooking medium at one or more corresponding first locations within the plumbing system; one or more heating elements located within the plumbing system that provide heat to the cooking medium at one or more corresponding second locations within the plumbing system, wherein the controller receives signals from the one or more temperature sensors and provides signals to the one or more heating elements to control temperature within the plumbing system based on the signals received from one or more temperature sensors according to a predetermined temperature profile.

9. The cooking apparatus of claim 1, further comprising: a filtration system that is in fluid communication with the one or more cooking vessels and is configured: to receive used cooking media from the one or more cooking vessels; to filter the used cooking media to generate filtered cooking media; and to provide the filtered cooking media to the at least one rotary inlet as one of the at least one cooking medium source, wherein the controller is further configured to control movement of the cooking medium through the plumbing system and to control the filtration system to perform a filtration operation.

10. The cooking apparatus of claim 9, wherein the at least one rotary valve includes a plurality of inlet ports communicating with the at least rotary inlet, the plurality of inlet ports including a first input port receiving new oil from a new oil reservoir, a second input port receiving recycled filtered oil from the filtration system, and a third input port receiving new oil from a fill port configured to supply new oil to the new oil reservoir.

11. The cooking apparatus of claim 7, wherein the at least one cooking medium source includes a filtration system and a new oil reservoir, the at filtration system configured to provide recycled and filtered oil back to the one or more cooking vessels, the new oil reservoir configured to provide new oil that is cooler in temperature than the recycled and filtered oil, and wherein the temperature sensor mounted in the rotary valve determines whether air, new oil, or recycled and filtered oil is being delivered through the rotary valve based on the temperature of fluid passing through the rotary valve.

12. The cooking apparatus of claim 11, wherein the controller uses inputs from the rotary position sensor and the temperature sensor in the rotary valve to confirm what fluid is currently being transferred and which source and destination the fluid is being transferred from and to in the plumbing system based on these inputs.

* * * * *

UNITED STATES PATENT AND TRADEMARK OFFICE
CERTIFICATE OF CORRECTION

PATENT NO. : 10,736,463 B2
APPLICATION NO. : 15/458346
DATED : August 11, 2020
INVENTOR(S) : Mark Gogel et al.

Page 1 of 1

It is certified that error appears in the above-identified patent and that said Letters Patent is hereby corrected as shown below:

In the Claims

Claim 5, Column 15, Line 8, "temperatures up to 4000 F." should read --temperatures up to 400 F.--

Claim 11, Column 16, Line 32, "the at filtration system" should read --the filtration system--

Signed and Sealed this
Tenth Day of November, 2020

Andrei Iancu
*Director of the United States Patent and Trademark Office*